United States Patent [19]

Eichholz et al.

[11] 4,028,169
[45] June 7, 1977

[54] WINDING DRUM FOR PRODUCING BELT INSERTS FOR PNEUMATIC TIRES

[75] Inventors: Werner Eichholz; Gerd Krebs, both of Hamburg, Germany

[73] Assignee: Phoenix Gummiwerke AG, Hamburg, Germany

[22] Filed: Oct. 15, 1975

[21] Appl. No.: 622,712

[30] Foreign Application Priority Data

Nov. 19, 1974 Germany..................2454751

[52] U.S. Cl. ........................... 156/416; 156/420
[51] Int. Cl.² ........................... B29H 17/16
[58] Field of Search ...... 156/123, 128, 133, 394 R, 156/414, 415, 416–420

[56] References Cited

UNITED STATES PATENTS

| 1,923,705 | 8/1933 | Campbell et al. | 156/416 |
| 2,935,117 | 5/1960 | Pfeiffer | 156/415 |
| 3,018,213 | 1/1962 | Kraft | 156/416 |
| 3,111,445 | 11/1963 | Pouilloux et al. | 156/415 |
| 3,386,875 | 6/1968 | Grote | 156/416 |
| 3,531,356 | 9/1970 | Henley | 156/416 |
| 3,813,271 | 5/1974 | Riggs | 156/414 |
| 3,844,871 | 10/1974 | Habert | 156/415 X |

FOREIGN PATENTS OR APPLICATIONS 1,000,262  8/1965  United Kingdom ............... 156/416

*Primary Examiner*—Douglas J. Drummond
*Assistant Examiner*—John E. Kittle

[57] ABSTRACT

A winding drum for producing belt inserts for pneumatic tires has a casing the diameter of which is variable. A characteristic feature of the drum is that its cylindrical casing at its radially inwardly located edges is changed—looking in cross-section—into V-shaped disks which are inwardly bent. These disks and the casing consist of polyurethane with an E-modulus of about 800. The edges of the disks are fixed air tightly in a drum. Supports adjustable radially in an axial direction lie against the V-shaped bent sections of the disks.

7 Claims, 2 Drawing Figures

WINDING DRUM FOR PRODUCING BELT INSERTS FOR PNEUMATIC TIRES

This invention relates to a winding drum having a casing with a diametrically variable shell for producing belt inserts for pneumatic tires.

When pneumatic tires with belt inserts are made, the inserts are produced in a separate operation. As a rule, drums for this purpose are used, the construction of which are similar to that of a belt disk, but the circumference of which can be changed by certain striking mechanisms. It is necessary to be able to diminish the diameter in order to be able to remove the belt tightly sitting upon the drum. Different winding drums are required for belts of different diameters. Furthermore, additional operating devices are necessary for the winding procedures, so that belts which may consist, for example, of folded cord tissue linings, may be made precisely and free from air enclosures. There is a substantial amount of operational procedures and devices required for this purpose.

An object of the present invention is to provide a winding drum of the described type, the construction of which is much simpler than those of prior art and which does not need the previously required operational steps.

Other objects of the present invention will become apparent in the course of the following specification.

In the accomplishment of the objectives of the present invention it was found desirable to provide a drum having a cylindrical casing which at its radially inwardly located edges is changed, looking in cross-section, into V-shaped disks which are inwardly bent. These disks and the casing consist of polyurethane with an E-modulum of about 800. The edges of the disks are fixed air tightly in a drum. Supports adjustable radially in an axial direction lie against the V-shaped bent sections of the disks.

The polyurethane, which is used can consist of polyesterurethane or polyetherurethane. The provided E-modulum of about 800 can vary between 500 and 950. Substances can be also used which have similar high properties, particularly in relation to the E-modulum.

In a cylindrical casing of this type which is substantially U-shaped when viewed in cross-section and is combined with adjustable supports, it is possible to operate the casing in positions having different circumferences. By means of air pressure, the belt can be subjected to pressure from the inside, so that a precisely provided shaping with predetermined circumference is produced. The supports directed from the side against the bent sections can in combination with air pressure limit precisely a predetermined maximal spreading. Thus, a casing can be used for producing belt inserts with different diameters. For that purpose, it is merely necessary to move the adjustable supports to a different position.

While the greatest diameter of the belt is produced with a fully spread casing and engaged supports, the smallest diameter of the belt can be produced upon the same casing with greatly inwardly moved supports. Due to the high E-modulum there is provided a practically metallically hard support for the belt construction. Air pressure required for changing the shape of the casing is introduced radially from the inside and should be set as precisely as possible due to the manner of operating the winding casing.

According to a further feature of the present invention it is advantageous to provide grooves upon the bent side of the annular bent sections of the disks. These annular grooves are located in the middle of the disks upon the inner side and upon the outer side of two radially inwardly and outwardly located edges of a disk. This will guide the bending procedure during the changing of the diameter by air pressure and supports within a precisely predetermined range. This provides a particularly precise and concentric form change. In addition, there is a contribution to the precise form change by the fact that the wall of the cylindrical casing is about twice as thick as the side disks. By changing air pressure, the casing can have a convex, concave or flat outer surface in cross-section. By changing from a flat shape to a convex shape the finished belt can be subjected to higher pressure and thus made more compact. A slight curving of the casing can be desirable since then a belt shape is produced which is precisely adapted to the curvature of the base and running strips.

The result is that in tires the acting forces are distributed quite uniformly throughout the width of the running surfaces.

The present invention further provides that the servicing of the winding drum can be simplified when the side supports are shifted jointly and uniformly.

Furhtermore, in accordance with the present invention the side supports can be constructed as an annular disk. In that case only three adjusting devices are required upon each side. Then it is easier to provide a precisely corresponding adjustment. The engagement of the supporting disks should be arranged in a roundabout manner, since their impact provides a particularly receptive adjustment. Magnets can be embedded in the wall of the casing which will provide a preliminary fixing of the steel cord tissues during the mounting. The magnets can be fixed mechanically but they should not be too large so that they will lie sufficiently firmly in the wall even in case of an extension of the material.

The invention will appear more clearly from the following detailed description when taken in connection with the accompanying drawing a showing by way of example only, a preferred embodiment of the inventive idea.

Figure 1:
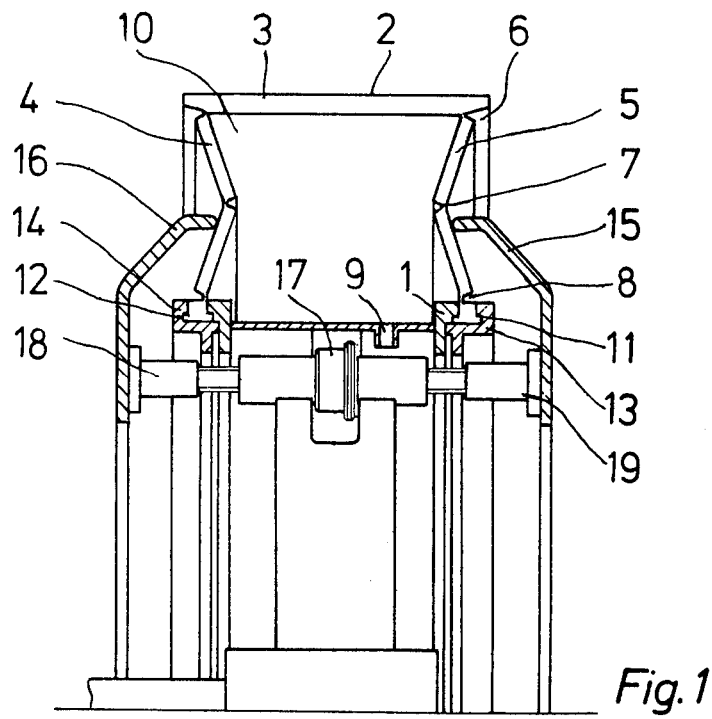
FIG. 1 is a secton through the upper part of a winding drum in the belt receiving condition.
Figure 2:
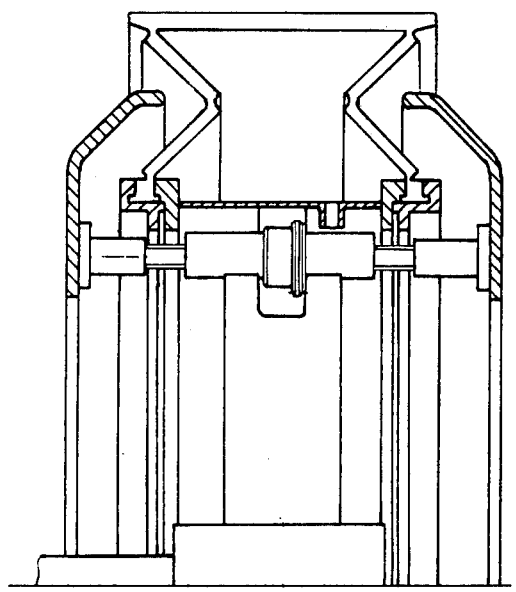
FIG. 2 shows the same section in the belt withdrawing condition.

The drawing shows a drum 1 upon which a substantially U-shaped casing 2 is air-tightly fixed. The casing 2 consists of a cylindrical casing portion 3 annd two disks 4 and 5. The casing 3 and the disks 4 and 5 consists of polyesterurethane with and E-modulum of 800. The cylindrical surface of the casing 3 is used for producing a belt for pneumatic tires. The disks 4 and 5 are V-shaped, being bent inwardly and having notches at their bent locations 6, 7 and 8.

Due to this arrangement when the casing 3 is increased or decreased radially the change in shape is limited solely within the notched sections. The radial increase or diminishing of the casing 3 takes place by compressed air which flows through the opening 9 into the hollow space 10. Foot parts 11 and 12 are fixed air-tightly by clamping rings 13 and 14. Adjustable supports 15 and 16 lie upon the disks 4 and 5. They are adjustable axially by a drive 17 in connection with the screw parts 18 and 19. The outer diameter of the casing 3 is limited to a specific circumference depending upon the position of supports 15 and 16. When completed, the belt can be subjected from interior to a substantial pressure by the increase in compressed air, possibly in combination with a small shifting of the supports 15 and 16. The supports 15 and 16 can be constructed as an outer annular disk which is in connection with three driving members. The driving members are uniformly distributed upon the circumference of the drum 1.

What is claimed is:

1. A winding drum for producing belt inserts for pneumatic tires, comprising a cylindrical casing having axial outer edges, disks connected with said edges and having radially inwardly extending portions, said disks being foldable to facilitate radial expansion of the casing, an inner drum, said disks having radial inner ends sealed to said drum to form an annular air chamber between the drum and the casing, and supports engaging said disk portions radially outward of said drum at adjustable positions limiting the amount of unfolding which the disks can carry out and thus controlling the radial expansion of the casing.

2. A drum according to claim 1, wherein said casing and said disks consist of polyurethane with an E-modulum of substantially 800.

3. A drum according to claim 1, wherein said inwardly extending portions have inner grooves.

4. A drum according to claim 1, wherein the walls of said casing are substantially twice as thick as said disks.

5. A drum according to claim 1, wherein said supports are commonly uniformly adjustable.

6. A drum according to claim 1, wherein said supports consist of a annular disk.

7. A drum according to claim 3 wherein said disks, wherein said radially inwardly extending portions are V-shaped.

* * * * *